(12) United States Patent
Argillier et al.

(10) Patent No.: US 7,521,482 B2
(45) Date of Patent: *Apr. 21, 2009

(54) EMULSION CONTAINING AN OPPOSITELY-CHARGED SURFACTANT AND POLYMER AND THE PRODUCTION METHOD THEREOF

(75) Inventors: Jean-François Argillier, Saint Cloud (FR); Isabelle Henaut, Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 226 days.

This patent is subject to a terminal disclaimer.

(21) Appl. No.: 10/493,808

(22) PCT Filed: Oct. 22, 2002

(86) PCT No.: PCT/FR02/03607

§ 371 (c)(1),
(2), (4) Date: Sep. 10, 2004

(87) PCT Pub. No.: WO03/037496

PCT Pub. Date: May 8, 2003

(65) Prior Publication Data

US 2005/0034632 A1 Feb. 17, 2005

(30) Foreign Application Priority Data

Oct. 29, 2001 (FR) .................................. 01 14085

(51) Int. Cl.
*B01F 3/08* (2006.01)
*B01F 17/00* (2006.01)

(52) U.S. Cl. .................... 516/27; 516/198; 516/202; 516/203

(58) Field of Classification Search ............... 516/53, 516/27, 198, 202, 203
See application file for complete search history.

(56) References Cited

U.S. PATENT DOCUMENTS

| | | | | | |
|---|---|---|---|---|---|
| 3,647,507 | A | * | 3/1972 | Ashcraft | 427/288 |
| 3,664,983 | A | * | 5/1972 | Logan | 524/747 |
| 3,734,867 | A | * | 5/1973 | Will | 521/63 |
| 3,917,574 | A | * | 11/1975 | Gibbs et al. | 526/87 |
| 4,002,589 | A | * | 1/1977 | Farley et al. | 525/59 |
| 5,846,308 | A | * | 12/1998 | Lauzon | 106/218 |
| 6,172,010 | B1 | * | 1/2001 | Argillier et al. | 507/102 |
| 6,600,076 | B1 | * | 7/2003 | Abbott et al. | 568/21 |
| 2004/0052865 | A1 | * | 3/2004 | Gower et al. | 424/687 |
| 2005/0038128 | A1 | * | 2/2005 | Argillier et al. | 516/9 |

FOREIGN PATENT DOCUMENTS

| | | |
|---|---|---|
| EP | 0 134 756 | 7/1984 |
| FR | 2 520 747 | 1/1983 |
| JP | 1-313415 | 12/1989 |
| WO | 94/14320 | 7/1994 |
| WO | 98/26864 | 6/1998 |

OTHER PUBLICATIONS

XP-002207283, Database WPI, Section Ch, Week 198913, Derwent Publications Ltd.
XP-002207284, Database WPI, Section Ch, Week 199505, Derwent Publications, Ltd.
International Search Report w/English translation.

* cited by examiner

*Primary Examiner*—Timothy J Kugel
(74) *Attorney, Agent, or Firm*—Antonelli, Terry, Stout & Kraus, LLP.

(57) ABSTRACT

An emulsion is optimized in that it is stabilized by the presence of a surfactant specifically selected according to the type of a polymer, or copolymer, also present in the emulsion. The surfactant and the polymer are selected oppositely charged.

25 Claims, No Drawings

EMULSION CONTAINING AN OPPOSITELY-CHARGED SURFACTANT AND POLYMER AND THE PRODUCTION METHOD THEREOF

FIELD OF THE INVENTION

The present invention relates to an emulsion of at least two immiscible fluids, stabilized by an optimized combination of surfactants and polymers, or of hydrosoluble copolymers. Preferably, the base fluids of the emulsion are oil and water.

The emulsions according to the present invention can be used in many fields of application, for example the petroleum sphere, the cosmetics industry, the pharmaceutical industry, the food-processing industry, road surfacing, polymer synthesis, etc.

SUMMARY OF THE INVENTION

The present invention thus relates to an oil-in-water emulsion comprising at least a surfactant and a polymer, the surfactant and the polymer being selected oppositely charged.

The applicant has found that, surprisingly enough, it is possible to control obtaining a stable or practically stable emulsion from a composition of optimized surfactant concentration if a polymer or a copolymer oppositely charged in relation to the surfactant is associated therewith. A cationic polymer or copolymer is associated with an anionic surfactant, and an anionic polymer or copolymer is associated with a cationic surfactant.

It is possible to use as surfactants in the present invention all the conventional anionic surfactants, such that the anionic function is:
carboxylates:
  alkaline metal soaps, alkyl or alkylether carboxylates,
  N-acylaminoacids,
  N-acylglutamates,
  N-acylpolypeptides,
sulfonates:
  alkylbenzene sulfonates,
  paraffin sulfonates,
  α-olefin sulfonates,
  petroleum sulfonates,
  lignosulfonates,
  sulfosuccinic derivatives,
  polynaphthylmethane sulfonates,
  alkyltaurides,
sulfates:
  alkyl sulfates,
  alkylether sulfates,
phosphates:
  monoalkyl phosphates,
  dialkyl phosphates,
phosphonates.
The following cationic surfactants can be mentioned:
alkylamine salts,
quaternary ammonium salts whose nitrogen:
  comprises a fatty chain, for example, alkyltrimethyl or triethyl ammonium derivatives, alkyldimethyl benzylammonium derivatives,
  comprises two fatty chains,
  is part of a heterocyclic structure, for example, pyridinium, imidazolinium, quinolinium, piperidinium, morpholinium derivatives.
All the conventional anionic polymers can be used according to the present invention, for example:
synthetic polymers or copolymers derived from:
  anionic monomers containing carboxylate or sulfonate or phosphate or phosphonate groups, such as acrylate, methacrylate, itaconate, 2-acrylamido-2-methyl-propane sulfonate, 2-methacryloyloxy ethane sulfonate, 3-acrylamido-3-methyl butanoate, styrene sulfonate, styrene carboxylate, vinyl sulfonate monomers, maleic acid salts,
synthetic copolymers derived from:
  anionic monomers, for example in those described above, and neutral monomers, for example acrylamide, acrylic acid, vinyl pyrrolidone, ethylene oxide, propylene oxide, maleic anhydride, vinylic alcohol, hydroxyethylacrylate, . . .
natural polymers such as:
  CMC type negatively modified cellulose derivatives,
  polysaccharides of xanthan, alginate, arabic gum type,
  negatively modified starches,
  negatively modified galactomannanes.
All the conventional cationic polymers can be used according to the present invention, for example:
synthetic polymers or copolymers derived from conventional cationic monomers, i.e. of the following general formula:

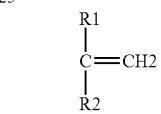

where R1 or R2 comprise at least one N atom.
  polyethylene imines,
  polyamide amines,
  polyamines,
  synthetic copolymers derived from:
    cationic monomers and neutral monomers (described above).
  natural polymers:
    positively modified starches,
    chitosanes,
    gelatin,
    positively modified galactomannanes,
    positively modified cellulose derivatives.

According to the invention, the surfactant used can be cationic and have a concentration below approximately $5.10^{-3}$ mol/l, and the polymer can be anionic.

The surfactant can be anionic and have a concentration below approximately $5.10^{-3}$ mol/l, and the polymer can be cationic.

The anionic polymer can be an acrylamide/2-acrylamide-2-methyl-propane sulfonate (AM/AMPS) type copolymer whose charged part proportion can range between 1 and 50%, preferably between 10 and 25%. The surfactant can be of dodecyltrimethyl ammonium bromide (DOTAB) type.

The anionic polymer can be a copolymer of acrylamide/acrylic acid (AM/acrylic acid) type in an alkaline medium whose acrylic acid proportion can range between 1 and 50%, preferably between 10 and 25%. The surfactant can be of DOTAB type.

The anionic polymer can be a natural polymer, for example of arabic gum type.

The cationic polymer can be a copolymer of acrylamide/acryloyloxy trimethyl ammonium chloride type whose charged part proportion can range between 1 and 50%, preferably between 10 and 25%. The surfactant can be of sodium dodecyl sulfate (SDS) type.

The invention also relates to a method for manufacturing an emulsion, from water and oil, of at least one surfactant and at least one hydrosoluble polymer. In the method, a surfactant and a polymer, or a copolymer, oppositely charged, are combined in the aqueous phase and the polymer concentration is determined to obtain a stable emulsion with the lowest possible surfactant proportion below a $5.10^{-3}$ mol/l concentration.

The polymer concentration can be determined as a function of the charge rate of the polymer and of the concentration in surfactant used. Considering the electrostatic nature of the interactions between polymer and surfactant, their respective concentrations can be a function of the ionic strength of the medium.

The surfactant is thus rather and sufficiently water soluble so that, after mixing in the water with the hydrosoluble polymer, a complex forms and is set at the interfaces.

The emulsion can also contain solids (cuttings, neutral colloids, . . . ) or other non-charged hydrosoluble polymers, anticorrosion additives, etc.

Other features and advantages of the present invention will be clear from reading the description of non limitative tests hereafter.

The tests are mainly based on the comparison, for different compositions of emulsion additives (surfactants and polymers), of the emulsion stability measurement during bottle tests. Stability is evaluated by determining two half life times as defined below:

Procedure:

The emulsions are prepared as follows. The surfactant at variable concentration and the hydrosoluble polymer, also at variable concentration, are incorporated to the aqueous phase. If necessary, the pH value is then adjusted by addition of acid or soda. Emulsification is carried out at ambient temperature in a 200-ml beaker by means of a Heildoph stirrer provided with a three-paddle propeller. The rotating speed is generally 800 rpm. In general, the stirring time is about 20 minutes. Addition of oil is carried out by means of a disposable syringe in the aqueous solution. The ratio of the water/oil phases is variable. In the following examples, the ratio is of the order of 30 to 40% by volume of oil and 70 to 60% by volume of water, but these proportions are not limitative, other proportions are suitable insofar as they can form an emulsion. In all of the examples described, the emulsions obtained are of oil-in-water type.

The bottle tests allow to monitor the behaviour of the emulsion formed in the course of time. The total volume of freshly manufactured emulsion is fed into a 100-ml test tube. The emulsion is then regularly observed so as to determine the kinetics of the separation phenomena. In our system, the various phenomena observed are:

emulsion creaming, oil coalescence.

The volumes of the emulsion/water and emulsion/oil fronts (when the emulsion breaks) are thus recorded as a function of time in order to allow determination of the half life times of the water ($T_{1/2\ water}$) and of the oil ($T_{1/2\ oil}$). The half life times are defined as the times from which half the volume of the phase considered has been recovered. Recovered is understood to mean non-emulsified.

The destabilization mechanisms observed can be described as follows:

In the initial state, i.e. at t=0, the emulsion is homogeneous, the oil droplets are homogeneously distributed within the aqueous continuous phase.

During a first stage, the phenomenon of oil droplets creaming is observed, i.e. a water/emulsion front creates, separating two distinct phases: an aqueous phase at the bottom and the emulsion phase above.

During a second stage, the oil droplets creaming phenomenon clearly slows down, and coalescence of the oil droplets is observed. A third phase therefore appears: the oil phase located above the emulsion. During this stage, the evolution rate of the oil/emulsion front is generally much higher than the evolution rate of the water/emulsion front.

In the final state, total destabilization of the emulsion is observed. We therefore have a system only consisting of the two phases distributed according to their respective masses: the upper phase consisting of oil and the lower phase consisting of water.

Systems Tested:

1) Surfactants

Dodecyltrimethyl ammonium bromide (DOTAB): cationic surfactant having the general formula as follows:

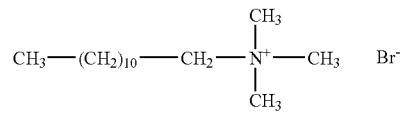

Hexadecyltrimethyl ammonium bromide (CTAB): cationic surfactant having the general formula as follows:

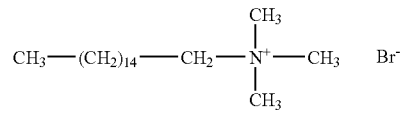

Sodium dodecyl sulfate (SDS): anionic surfactant having the general formula as follows:

It can be noted that the surfactants used in the tests have rather high HLB values and preferably stabilize oil-in-water emulsions.

2) Polymers

Arabic gum extracted from acacia (molecular mass Mw of about 250,000 g/mol),

Acrylamide/Acrylamido methyl propane sulfonate copolymer AM/AMPS having the general formula as follows:

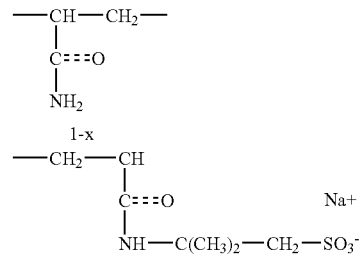

One of the characteristics of the polymers is their viscosity at 10% active matter in water (Vis) expressed in centipoise (cP).

AM/AMPS 80/20 x=20% and Vis=3300 cP
AM/AMPS 90/10 x=10% and Vis=3000 cP.
Acrylamide/Acrylic acid copolymer of general formula as follows:

One of the characteristics of the polymers is their viscosity at 10% active matter in water (Vis) expressed in centipoise.

AM/AA 90/10 x=10% and Vis=25000 cP
AM/AA 90/10 x=10% and Vis=8000 cP
AM/AA 90/10 x=10% and Vis=3500 cP
AM/AA 80/20 x=20% and Vis=3600 cP.
acrylamide/acryloyloxy trimethyl ammonium chloride copolymer of general formula as follows:

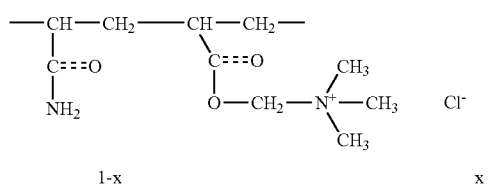

The acrylamide/acryloyloxy trimethyl ammonium chloride 90/10 (x=10%) and acrylamide/acryloyloxy trimethyl ammonium chloride 80/20 (x=20%) copolymers have viscosities at 10% of the order of 3000 cP.

In the examples, the oil phase is either:

Colza methyl ester: Colza methyl ester (CME) is a methylated colza oil derivative ($T_F=-10°$ C., $d_{15}=0.917$-$0.918$)

or:

Dodecane: dodecane of purity 95% min. Containing at least 35% n-dodecane. It is a colorless oil (Empirical formula: $C_{12}H_{26}$ M=170 g/mol; $T_F=-9.9°$ C., $T_{eb}=215$-$217°$ C., $d_{15}=0.75$).

Test No. 1: Oil Phase: Colza Methyl Ester. Emulsifiers: DOTAB and Arabic Gum (AG)

The operating conditions are as follows:

| Emulsion type | Direct emulsion CME in distilled water |
|---|---|
| Oil/water proportions (%) | 30/70 |
| Volume prepared | 150 ml |
| DOTAB brought into solution | In distilled water |
| Initial pH value of the water | pH = 8 |
| Temperature | Ambient |
| Stirring type | Heildoph/3-paddle propeller |
| Stirring rate | 1000 rpm |
| Stirring time | 20 minutes |

The results are as follows:

| | $T_{1/2}$ water (min) | | $T_{1/2}$ ester (min) | |
|---|---|---|---|---|
| [DOTAB] (CMC = 15 mmol/l) | Without AG | 2 g/l AG | Without AG | 2 g/l AG |
| No surfactant | 0.6 | 1.1 | 0.6 | 1.3 |
| 2/1000 | 0.6 | 1.1 | 0.6 | 3.3 |
| 5/1000 | 0.6 | 22.7 | 0.6 | >3 days |
| 1/100 | 0.6 | 33.2 | 0.6 | >3 days |
| 2/100 | 1.0 | 111.5 | 1.1 | >3 days |
| 1/10 | 24.1 | 174.6 | 56.4 | >3 days |

The results show that the addition of anionic polymer (arabic gum AG) in the presence of a cationic surfactant (DOTAB) leads to an emulsion stabilization. It can be noted that the surfactant alone, at a concentration below 1/10 of the CMC (critical micelle concentration), cannot stabilize the emulsion (half life times below 2 minutes). Addition of the anionic polymer allows to increase the stability very significantly. It can however be noted that a minimum surfactant concentration is necessary, in this example, of 5/1000 of the CMC.

It has also been observed that the arabic gum alone causes no significant stabilization of the colza methyl ester/water system. In fact, the half life times, in relation to an emulsion containing no additive, are of the same order.

In all the tests hereafter, the operating conditions are as follows:

| Emulsion type | Direct emulsion Dodecane in distilled water |
|---|---|
| Oil/water proportions (%) | 40/60 |
| Volume prepared | 100 ml |
| Surfactant and/or polymer brought into solution | In distilled water |
| Initial pH value of the water | pH = 8 |
| Temperature | Ambient |
| Stirring type | Heildoph/3-paddle propeller |
| Stirring rate | 800 rpm |
| Stirring time | 20 minutes |

Test No. 2: Oil Phase: Dodecane. Emulsifiers: DOTAB and AM/AA

The polymer is AM/AA (90/10, Vis=3500 cP) and the surfactant is DOTAB. The pH value is adjusted at 8, which ensures that at least part of the acrylic functions is in form of negatively charged acrylates.

The results are as follows:

| | | T1/2 water (min) | | T1/2 dodecane (min) | |
|---|---|---|---|---|---|
| DOTAB | Concentr. (mmol/l) | Without polymer | 1 g/l polymer | Without polymer | 1 g/l polymer |
| No surfactant | 0 | <0.6 | 0.6 | <0.6 | 0.6 |
| 2.5/100 CMC | 0.375 | <0.6 | 1.5 | <0.6 | 5.5 |
| 5/100 CMC | 0.75 | <0.6 | 3.7 | <0.6 | 15.8 |
| 1/10 CMC | 1.5 | <0.6 | 2.9 | <0.6 | 16.5 |
| 2/10 CMC | 3 | <0.6 | 2.8 | <0.6 | 11.8 |
| 3/10 CMC | 4.5 | 2.4 | 2.7 | 2.4 | 10.8 |

The presence of basic polymer leads to a notable stabilization of the emulsion, in particular for the $T_{1/2}$ of the dodecane.

Stabilization is more marked for the DOTAB concentrations below 2/10 of the CMC. In fact, under such conditions, an increase by more than 20 times the $T_{1/2}$ of the dodecane and about 5 times the $T_{1/2}$ of the water is observed.

Test No. 3: Oil Phase: Dodecane. Emulsifiers: DOTAB and AM/AA. Influence of the Polymer Concentration In this test, the polymer used is AM/AA (90/10, Vis=3500 cP). The pH value is 7. The results are given in the table hereafter:

|  | [DOTAB] (mmol/l) | T1/2 water (min) | T1/2 dodecane (min) |
|---|---|---|---|
| No polymer | 1.5 | <0.6 | <0.6 |
| 0.5 g/l | 1.5 | 1.40 | 8.6 |
| 1 g/l | 1.5 | 2.9 | 16.5 |

These tests show that the polymer concentration is a parameter that influences the emulsion stability. Thus, an increase in the polymer concentration leads to a significant stabilization increase.

Test No. 4: Oil Phase: Dodecane. Emulsifiers: DOTAB and AM/AA. Influence of the Polymer Mass In this part, the polymers used are the AM/AA 90/10 copolymers of different molecular masses (characterized by their viscosity at 10%). The polymer concentration is 1 g/l. The pH value is adjusted at 7.

The results are as follows:

| Polymer viscosity (cP) | [DOTAB] (mmol/l) | T1/2 water (min) | T1/2 dodecane (min) |
|---|---|---|---|
| 25000 | 1.5 | 6.6 | 34.8 |
| 8000 | 1.5 | 4.60 | 15.6 |
| 2500 | 1.5 | 2.9 | 16.5 |

These examples show that the higher the molar mass of the polymer, the better the stabilization quality for the same concentration. In fact, this could be explained by the fact that the longer the chain, the greater the steric hindrance at the interface, which consequently leads to a greater stabilization effect. Furthermore, the polymers of higher mass lead, at equal concentration, to a viscosity increase of the aqueous phase, which allows the creaming and coalescence phenomena to slow down.

Test No. 5: Oil Phase: Dodecane. Emulsifiers: DOTAB and AM/AA. Influence of the Polymer Charge Rate In this test, the polymers used are AM/AA 90/10 (Vis=3500 cP) and AM/AA 80/20 (Vis=3600 cP) at a concentration of 1 g/l. The pH value is 7.

The results are:

| Polymer | [DOTAB] (mmol/l) | T1/2 water (min) | T1/2 dodecane (min) |
|---|---|---|---|
| No polymer | 1.5 | <0.6 | <0.6 |
| AM/AA 90/10 | 1.5 | 2.9 | 16.5 |
| AM/AA 80/20 | 1.5 | 14.4 | 254.3 |

It is clear that the charge rate of the polymer plays an important part in the stabilization efficiency of the emulsions. In fact, the mass being equivalent, a polymer twice as charged allows to multiply by 15 the half life times. This can be explained by the fact that the polymer containing more charged monomers forms a more stable electrostatic complex with the surfactant molecules, considering the greater number of interactions of electrostatic type for the same chain length.

Test No. 6: Oil Phase: Dodecane. Emulsifiers: DOTAB and AM/AA. Influence of the Ionic Strength In this example, the polymer used is AM/AA 80/20 (Vis=3600 cP) at a concentration of 1 g/l at pH 7. The DOTAB concentration is 1.5 mmol/l. In order to study the influence of the ionic strength on the stability of an emulsion, sodium chloride is added to the aqueous phase for a studied concentration range between 0 and 1 mol/l.

The results are:

| [NaCl] (mol/l) | T1/2 water (min) | T1/2 dodecane (min) |
|---|---|---|
| 0 | 14.4 | 254 |
| $10^{-4}$ | 9.4 | 231 |
| $10^{-3}$ | 6 | 156 |
| $10^{-2}$ | 3.8 | 66 |
| $10^{-1}$ | 3.2 | 8.9 |
| 1 | 1 | 2.7 |

The results show that the presence of sodium chloride in the continuous phase actually leads to a decrease in the emulsion stability. This sensitivity to the ionic strength was expected because of the role of the electrostatic interactions on the formation of the interfacial complex. One may however consider that, for an ionic strength that is not too high, the emulsion stability can be improved to a certain extent by increasing the surfactant concentration.

Test No. 7: Oil Phase: Dodecane. Emulsifiers: DOTAB and AM/AMPS

The DOTAB concentration is 1.5 mmol/l. The tests were carried out with two pH values: 8 and 1. The polymer used is AM/AMPS (80/20). The negative charge is provided by the non pH-dependent $SO_3^-$ functions.

The results are:

|  | T1/2 water (min) | T1/2 dodecane (min) |
|---|---|---|
| pH = 8 |  |  |
| Without polymer | <0.6 | <0.6 |
| AM/AMPS 80/20 1 g/l | 15.5 | 158.5 |
| pH = 1 |  |  |
| Without polymer | <0.6 | <0.6 |
| AM/AMPS 80/20 1 g/l | 4.4 | 96 |

The presence of this polymer also considerably increases the emulsion stability. One may assume that the slightly lower stabilization at pH=1, in relation to pH=8, can be due to the increase in the ionic strength of the medium by addition of HCl concentrated at 10 mol/l (about 0.5 ml in 60 ml aqueous phase, i.e. a chloride concentration of $8.10^{-2}$ mol/l) to obtain pH=1. This concentration is sufficient to generate a slight emulsion destabilization comparable to the previous example.

Test No. 8: Oil Phase: Dodecane. Emulsifiers: DOTAB and Acrylamide/Acryloyloxy Trimethyl Ammonium Chloride In this example, we examine the influence of the addition of a cationic polymer of same charge as the DOTAB surfactant. The DOTAB concentration is 1.5 mmol/l. The tests were carried out with two pH values: 8 and 1. The polymer used is acrylamide/acryloyloxy trimethyl ammonium chloride (80/20). The positive charge is provided by the quaternary amine functions of the non pH dependent acryloyloxy trimethyl ammonium chloride monomers.

| pH = 8 | T1/2 water (min) | T1/2 dodecane (min) |
|---|---|---|
| Without polymer | <0.6 | <0.6 |
| acrylamide/acryloyoxy trimethyl ammonium chloride 80/20 1 g/l | 2 | 2.5 |

| pH = 1 | T1/2 water (min) | T1/2 dodecane (min) |
|---|---|---|
| Without polymer | <0.6 | <0.6 |
| acrylamide/acryloyoxy trimethyl ammonium chloride 80/20 1 g/l | 1.4 | 1.8 |

It is clear that the cationic polymer does not allow to significantly improve the emulsion stabilization in the presence of a cationic surfactant, whether an acid or an alkaline medium. There is no formation of an interfacial polymer/surfactant complex. These results confirm the role of the attractions of electrostatic origin on the stabilization of the emulsion.

Test No. 9: Oil Phase: Dodecane. Emulsifiers: SDS and Acrylamide/Acryloyloxy Trimethyl Ammonium Chloride In the following tests, the surfactant is anionic: SDS.

In this test, the cationic polymer is acrylamide/acryloyloxy trimethyl ammonium chloride 90/10 (Vis=3000 cP). The results are given in the following table:

| | | T1/2 water | | T1/2 dodecane | |
|---|---|---|---|---|---|
| SDS | Conc. (mmol/l) | Without polymer | 0.5 g/l polymer | Without polymer | 0.5 g/l polymer |
| No surfactant | 0 | 0.5 min | 1 min | 0.5 min | 1 min |
| 1/1000 | 0.006 | 0.5 min | 6 min | 0.5 min | 7 min |
| 2.5/1000 | 0.015 | 0.5 min | 6 min | 0.5 min | 5 h |
| 5/1000 | 0.029 | 0.5 min | 6 min | 0.5 min | >9 days |

The presence of an oppositely charged polymer leads to an emulsion stabilization, in particular for the T1/2 of the dodecane. In relation to the system with DOTAB, stabilization is observed at an even lower concentration. From $5/1000^{th}$ of the CMC in SDS and 0.5 g/l cationic polymer, a stabilization towards the coalescence of the oil droplets greater than one week is observed. The stabilizing effect is thus greatly marked, even for relatively low surfactant and polymer concentrations.

Test No. 10: Oil Phase: Dodecane. Emulsifiers: SDS and AM/ADC. Influence of the Polymer Concentration In this test, the cationic polymer is AM/ADC 90/10 (Vis=3000 cP). The results are given in the table hereunder:

| [SDS] | | Polymer | T1/2 | |
|---|---|---|---|---|
| Xth CMC | mmol/l | g/l | Water | Dodecane |
| 5/1000 | 0.03 | 1 | 8 min | >15 days |
| 5/1000 | 0.03 | 0.5 | 6 min | >9 days |
| 5/1000 | 0.03 | 0.25 | 4 min | 9 days |

The polymer concentration has an effect on the emulsion stability but a small amount (0.25 g/l) is enough to stabilize the emulsion for more than a week (concerning the T1/2 of the dodecane). This surfactant SDS and cationic polymer (ADC functions) mixture is therefore very efficient for stabilization.

Test No. 11: Oil Phase: Dodecane. Emulsifiers: SDS and AM/AMPS

In this test, the polymer (AM/AMPS 90/10) and the surfactant (SDS) are identically charged. The results are given in the table hereunder:

| SDS | Conc. (mmol/l) | T1/2 water | T1/2 dodecane |
|---|---|---|---|
| No surfactant | 0 | 5 min | 5 min |
| 5/1000 | 0.03 | 2 min | 3 min |

The anionic polymer does not allow to stabilize the emulsion in the presence of an anionic surfactant.

The invention claimed is:

1. An oil-in-water emulsion comprising at least two immiscible liquids including water and oil, a surfactant and a hydrosoluble polymer or copolymer, characterized in that said surfactant is oppositely charged in relation to said polymer or copolymer and in that the surfactant is at a concentration below approximately $5 \times 10^{-3}$ mol/l.

2. An emulsion as claimed in claim 1, wherein the surfactant is cationic and the polymer is anionic.

3. An emulsion as claimed in claim 2, wherein the anionic polymer is an acrylamide/2-acrylamide-2-methyl-propane sulfonate copolymer whose charged part proportion ranges between 1 and 50%, and wherein the surfactant is dodecyltrimethyl ammonium bromide.

4. An emulsion as claimed in claim 2, wherein the anionic polymer is an acrylamide/acrylic acid copolymer used in basic pH whose charged part proportion ranges between 1 and 50%, and wherein the surfactant is dodecyltrimethyl ammonium bromide.

5. An emulsion as claimed in claim 2, wherein the anionic polymer is a natural polymer.

6. An emulsion as claimed in claim 2, wherein the anionic polymer is an acrylamide/2-acrylamide-2-methyl-propane sulfonate copolymer whose charged part proportion ranges between 10 and 25%, and wherein the surfactant is dodecyltrimethyl ammonium bromide.

7. An emulsion as claimed in claim 2, wherein the anionic polymer is an acrylamide/acrylic acid copolymer used in basic pH whose charged part proportion ranges between 10 and 25%, and wherein the surfactant is dodecyltnimethyl ammonium bramide.

8. An emulsion as claimed in claim 1, wherein the surfactant is anionic and the polymer is cationic.

9. An emulsion as claimed in claim 8, wherein the cationic polymer is an acrylamide/acryloyloxy trimethyl ammonium chloride copolymer whose charged part proportion ranges between 1 and 50%, and wherein the surfactant is sodium dodecyl sulfate.

10. An emulsion as claimed in claim 8, wherein the cationic polymer is an acrylamide/acryloyloxy trimethyl ammonium chloride copolymer whose charged part proportion ranges between 10 and 25%, and wherein the surfactant is sodium dodecyl sulfate.

11. An emulsion as claimed in claim 1, wherein the concentration of the polymer or copolymer is determined to obtain a stable oil-in-water emulsion with the lowest possible surfactant proportion below a $5\times10^{-3}$ mol/l concentration.

12. An emulsion as claimed in claim 1, wherein the polymer or copolymer is selected from the group consisting of:
   an anionic copolymer selected from the group consisting of an acrylamide/2-acrylamide-2-methyl-propane sulfonate copolymer whose charged part proportion ranges between 1 and 50% and an acrylamide/acrylic acid copolymer used in basic pH whose charged part proportion ranges between 1 and 50%,
   a natural polymer, and
   a cationic polymer;
   and wherein the surfactant is oppositely charged in relation to the polymer or copolymer.

13. A method of manufacturing an emulsion, from an aqueous continuous phase and oil, at least one surfactant and at least one polymer or copolymer, comprising:
   providing at least two immiscible liquids including an aqueous continuous phase and oil; and
   combining a surfactant and a hydrosoluble polymer or copolymer, oppositely charged, in the aqueous phase wherein the polymer concentration is determined to obtain a stable oil-in-water emulsion with the lowest possible surfactant proportion below a $5\times10^{-3}$ mol/l concentration.

14. A method as claimed in claim 13, wherein the surfactant is anionic and the polymer is cationic.

15. A method as claimed in claim 14, wherein the anionic polymer is an acrylamide/2-acrylamide-2-methyl-propane sulfonate copolymer whose charged part proportion ranges between 1 and 50%, and wherein the surfactant is dodecyltrimethyl ammonium bromide.

16. A method as claimed in claim 15, wherein the cationic polymer is an acrylamide/acryloyloxy trimethyl ammonium chloride copolymer whose charged part proportion ranges between 1 and 50%, and wherein the surfactant is sodium dodecyl sulfate.

17. A method as claimed in claim 15, wherein the cationic polymer is an acrylamide/acryloyloxy trimethyl ammonium chloride copolymer whose charged part proportion ranges between 10 and 25%, and wherein the surfactant is sodium dodecyl sulfate.

18. A method as claimed in claim 14, wherein the anionic polymer is an acrylamide/acrylic acid copolymer used in basic pH whose charged part proportion ranges between 1 and 50%, and wherein the surfactant is dodecyltrimethyl ammonium bromide.

19. A method as claimed in claim 14, wherein the anionic polymer is a natural polymer.

20. A method as claimed in claim 14, wherein the anionic polymer is an acrylamide/2-acrylamide-2-methyl-propane sulfonate copolymer whose charged part proportion ranges between 10 and 25%, and wherein the surfactant is dodecyltrimethyl ammonium bromide.

21. A method as claimed in claim 14, wherein the anionic polymer is an acrylamide/acrylic acid copolymer used in basic pH whose charged part proportion ranges between 10 and 25%, and wherein the surfactant is dodecyltrimethyl ammonium bromide.

22. A method as claimed in claim 13, wherein the surfactant is cationic and the polymer is anionic.

23. A method as claimed in claim 13, wherein the polymer or copolymer is selected from the group consisting of:
   an anionic copolymer selected from the group consisting of an acrylamide/2-acrylamide-2-methyl-propane sulfonate copolymer whose charged part proportion ranges between 1 and 50% and an acrylamide/acrylic acid copolymer used in basic pH whose charged part proportion ranges between 1 and 50%,
   a natural polymer, and
   a cationic polymer;
   and wherein the surfactant is oppositely charged in relation to the polymer or copolymer.

24. An oil-in-water emulsion comprising water, oil selected from the group consisting of colza methyl ester and dodecane, a surfactant and a hydrosoluble polymer or copolymer, characterized in that said surfactant is oppositely charged in relation to said polymer or copolymer and in that the surfactant is at a concentration below approximately $5\times10^{-3}$ mol/l.

25. A method of manufacturing an emulsion, from an aqueous continuous phase and oil, at least one surfactant and at east one polymer or copolymer, comprising:
   providing an aqueous continuous phase and oil selected from the group consisting of colza methyl ester and dodecane; and
   combining a surfactant and a hydrosoluble polymer or copolymer, oppositely charged, in the aqueous phase wherein the polymer concentration is determined to obtain a stable oil-in-water emulsion with the lowest possible surfactant proportion below a $5\times10^{-3}$ mol/l concentration.

* * * * *